(12) United States Patent
Hatheway et al.

(10) Patent No.: US 8,280,797 B2
(45) Date of Patent: *Oct. 2, 2012

(54) CLOSING IN AN ELECTRONIC MARKET

(75) Inventors: Frank Hatheway, Chevy Chase, MD (US); Daniel F. Moore, New Haven, CT (US); Timothy E. Cox, Chevy Chase, MD (US); Peter J. Martyn, Ridgewood, NJ (US); Dan Barnard Franks, Brooklyn, NY (US); Adam Seth Nunes, New York, NY (US); Oliver Albers, Arlington, VA (US)

(73) Assignee: The NASDAQ OMX Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,023

(22) Filed: Jan. 11, 2010

(65) Prior Publication Data

US 2010/0205109 A1    Aug. 12, 2010

Related U.S. Application Data

(63) Continuation of application No. 10/835,510, filed on Apr. 28, 2004, now Pat. No. 7,647,264.

(51) Int. Cl.
*G06Q 40/00* (2006.01)
(52) U.S. Cl. .................................. 705/36 R; 705/35
(58) Field of Classification Search ............... 705/36 R
See application file for complete search history.

(56) References Cited

U.S. PATENT DOCUMENTS

| | | | |
|---|---|---|---|
| 7,099,839 B2 * | 8/2006 | Madoff et al. | 705/37 |
| 7,162,448 B2 * | 1/2007 | Madoff et al. | 705/37 |
| 2001/0044757 A1 * | 11/2001 | Robb et al. | 705/27 |
| 2002/0128952 A1 * | 9/2002 | Melkomian et al. | 705/37 |
| 2002/0156717 A1 * | 10/2002 | Delta et al. | 705/37 |
| 2002/0194106 A1 * | 12/2002 | Kocher | 705/37 |
| 2007/0043652 A1 * | 2/2007 | Madoff et al. | 705/37 |

\* cited by examiner

*Primary Examiner* — Kirsten Apple
(74) *Attorney, Agent, or Firm* — Nixon & Vanderhye P.C.

(57) ABSTRACT

A method for trading a security in an electronic market includes receiving closing orders and orders for the security traded in the electronic market, disseminating an order imbalance indicator indicative of predicted trading characteristics of the security at the close of trading, determining a closing price for the security based on the closing orders and orders, and executing at least some of the closing orders at the determined closing price.

19 Claims, 3 Drawing Sheets

US 8,280,797 B2

CLOSING IN AN ELECTRONIC MARKET

This application is a continuation (and claims the benefit of priority under 35 U.S.C. 120) of U.S. application Ser. No. 10/835,510, filed on Apr. 28, 2004 now U.S. Pat. No. 7,647,264. The disclosure of the prior application is considered part of (and is incorporated by reference in) the disclosure of this application.

BACKGROUND

The invention relates to trading systems, particularly financial trading systems.

Electronic equity markets, such as The Nasdaq Stock Market® collect, aggregate and display trade information to market participants. Market participants initiate trades of securities by sending trade information to the electronic market on which the securities are traded. The trade information includes continuous orders for execution during a market trading session. After the close of a market trading session, a closing price is determined for each security.

SUMMARY

Certain investors, including mutual funds and derivative traders, need to execute transactions in a security at the closing price using "on-close" orders. Some electronic markets perform a closing process that takes the final trade of a security executed during the trading session as the closing price for that security. Since this closing process is performed without special treatment for on-close orders, an electronic market center does not guarantee that a particular on-close order will trade at the closing price. Without a guarantee from an electronic market center that a particular order will trade at the closing price, investors turn to manual markets or broker-dealers to guarantee them the closing price for their transactions.

In general, in one aspect, the invention features a method for trading a security in an electronic market. The method includes receiving closing orders and orders for the security traded in the electronic market, disseminating an order imbalance indicator indicative of predicted trading characteristics of the security at the close of trading, determining a closing price for the security based on the closing orders and orders, and executing at least some of the closing orders at the determined closing price.

In general, in another aspect, the invention features an electronic market for trading of securities. The electronic market includes a client station for entering a closing order for a security traded in the electronic market, and a server system. The server system includes a queue storing the closing order along with other orders, a process to disseminate an order imbalance indicator indicative of predicted trading characteristics of the security at the close of trading, and a process to determine a closing price for the security based on the stored orders and execute at least some of the orders at the determined closing price.

In general, in another aspect, the invention features a computer program product residing on a computer-readable medium for use in an electronic market for trading of securities comprises instructions for causing a system to receive closing orders and orders for the security traded in the electronic market, disseminate an order imbalance indicator indicative of predicted trading characteristics of the security at the close of trading, determine a closing price for the security based on the closing orders and orders, and execute at least some of the closing orders at the determined closing price.

In general, in another aspect, the invention features a method for trading a security in an electronic market. The method includes receiving closing orders and orders for the security traded in the electronic market, determining a closing price for the security based on the closing orders and orders, the closing price being within a predetermined range of a benchmark value representing market conditions prior to the close of trading, and executing at least some of the closing orders at the determined closing price.

In general, in another aspect, the invention features a system including a server system configured to send an information data stream to a trading system. The data stream includes at least one of an inside match price or a near indicative clearing price.

In general, in another aspect, the invention features a system including a client station coupled to a server system that is part of an electronic venue for trading financial products, and configured to send an order for a security to the server system. The order includes data fields including: a price value, a number of shares value, and an indicator value that indicates the order as an imbalance only order.

Embodiments of the invention may include one or more of the following features.

The closing orders include imbalance only orders.

The method includes modifying a limit price associated with one of the imbalance only orders based on a comparison between the limit price and an inside price.

The closing orders may include limit-on-close orders and/or market-on-close orders.

The method also includes periodically producing the order imbalance indicator over a series of time periods.

The order imbalance indicator at a first of the series of time periods includes at least one of: an inside match price, a number of shares paired at an inside match price, an on-close order imbalance, a buy/sell direction of the on-close order imbalance, an indicative clearing price range associated with the first of the series of times, or a percentage by which an indicative price varies from an inside price.

Determining the closing price includes determining a preliminary closing price, comparing the preliminary closing price to a benchmark value representing market conditions prior to the close of trading, and determining the closing price based on the comparison.

The benchmark value includes a volume weighted average of orders executed during a predetermined time period before the close of trading.

The inside match price is selected from an inside bid price, an inside offer price, an inside bid-offer midpoint price, or zero, based on an imbalance of closing orders.

The near indicative clearing price includes a price at which closing orders and continuous orders would execute if paired with each other.

The server system resides in a venue for trading securities electronically.

The venue is an electronic commerce network, an auction, an exchange, or an electronic exchange.

The imbalance only order executes in response to an imbalance in liquidity associated with the electronic venue.

Embodiments of the invention may include one or more of the following advantages.

Closing orders are executed in a single transaction. The information included in the imbalance indicator improves transparency and price discovery. Disseminating the imbalance indicator gives market participants an opportunity to adjust their trading based on the imbalance indicator by adjusting the price and/or size of existing imbalance only orders, or by submitting additional imbalance only orders. The closing process improves liquidity, reduces risk and reduces costs for investors seeking to trade at the closing price.

Other features and advantages of the invention will become apparent from the following description, and from the claims.

DESCRIPTION

Figure 1:
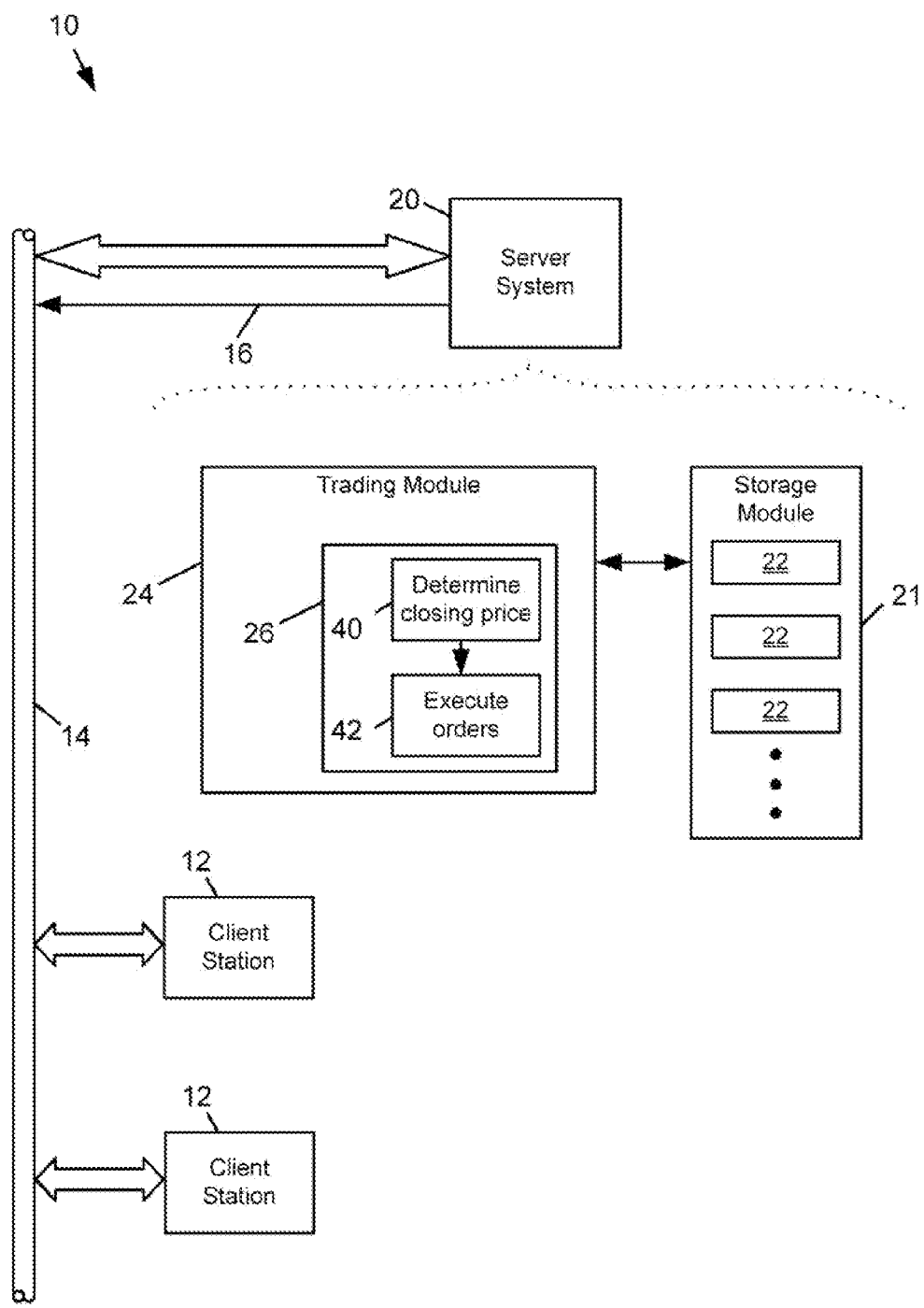
FIG. 1 is a block diagram of an electronic market for trading securities.

Referring to FIG. 1, an electronic market 10 is shown. The electronic market 10 includes client stations 12 in communication with a server system 20 over a distributed computing network 14 (e.g., the Internet, an intranet, a local area network, or other similar form of network). A client station 12 includes a process to send trade information (e.g., continuous orders, closing orders, etc.) entered by a user (e.g., a market participant, a market maker, etc.) to the server system 20. The server system 20 collects trade information from the client stations 12 and enters valid orders into a storage module 21. An order identifies a security and a number of shares of the security to be traded. A priced buy order includes a bid price at which to buy the shares. A priced sell order includes an offer price at which to sell the shares. The storage module 21 includes a queue 22 for each security traded in the market 10 that stores orders for that security.

The server system 20 includes a trading module 24 that executes trades of securities electronically based on the entered orders. After an order is executed or canceled, the order is removed from the storage module 21. The trading module 24 also includes a closing process 26 that runs after the end of a trading session to determine a closing price for each security and execute at least some of the entered orders for a security at the determined closing price. The server system 20 disseminates information about the market on a data feed 16 (over the network 14 or, alternatively, over a separate communication line) to the client stations 12.

In the electronic market 10, a user electronically trades with other users (as opposed to trading on a trading floor). Trading can occur over extended periods of time. An example of an electronic market, the Nasdaq Stock Market®, allows trading during a trading session (i.e., 9:30 a.m. to 4:00 p.m. ET). Orders placed and executed during the trading session are "continuous orders." The server system 20 maintains an "inside bid" price corresponding to the price of the best (i.e., highest) continuous buy order, and an "inside offer" price corresponding to the price of the best (i.e., lowest) continuous sell order, based on the most recently received continuous orders.

Orders placed during the trading session to be executed after the trading session at the closing price are "closing orders." Two types of closing orders are "On-Close" orders and "Imbalance Only" (IO) orders. On-Close orders can be un-priced and entered as "market-on-close" (MOC) orders, or priced and entered as "limit-on-close" (LOC) orders. A LOC buy order includes a buy limit price and a LOC sell order includes a sell limit price. On-Close orders, both MOC and LOC orders, execute at the price determined by the closing process. Thus, LOC buy orders are subject to price improvement (i.e., reduction) if the buy limit price is greater than the determined closing price, and LOC sell orders are subject to price improvement (i.e., increase) if the sell limit price is less than the determined closing price. In one embodiment, On-Close orders can be entered, cancelled, and/or corrected between 9:30:01 a.m. EST and 3:50:00 p.m., e.g., just after market open and just prior to market close, but are not displayed or disseminated by the server system 20.

IO orders execute only against any imbalance in liquidity, supplementing the liquidity provided by On-Close orders. IO order types are priced limit orders. The server system 20 enforces rules for entering or modifying submitted IO orders. For example, the server system 20 rejects IO orders that are submitted without a price. In one embodiment, IO orders are entered up until 3:59:59, e.g., just prior to market close, but they cannot be cancelled or modified after, e.g., 3:50:00 except to increase the number of shares or to increase the buy limit price or decrease the sell limit price. IO sell orders execute at or above the 4:00:00 inside offer, and IO buy orders execute at or below the 4:00:00 inside bid. Thus, IO buy orders are subject to price improvement (i.e., reduction) if the buy limit price is greater than the 4:00:00 inside bid, and LOC sell orders are subject to price improvement (i.e., increase) if the sell limit price is less than the 4:00:00 inside offer. As with On-Close orders, IO are not displayed or disseminated by the server system 20.

Figure 2:
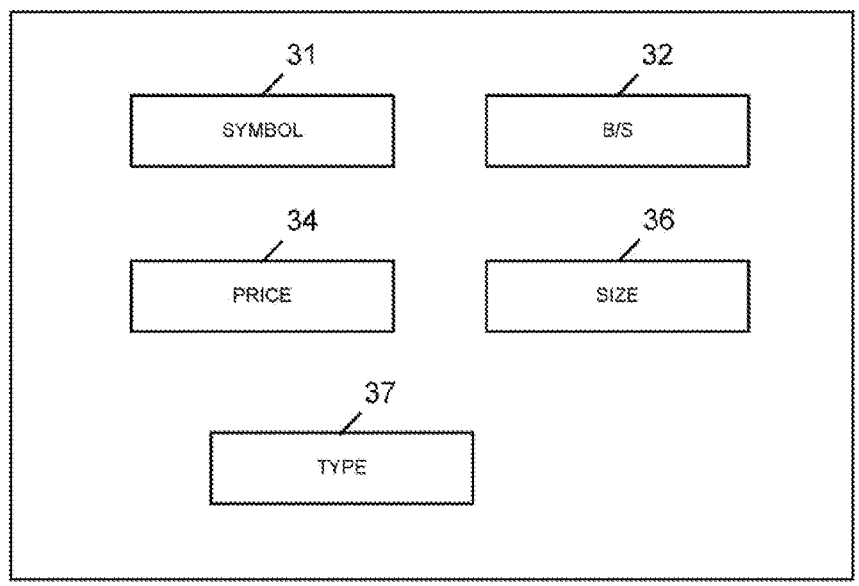
FIG. 2 shows exemplary order formats.
Figure 2:
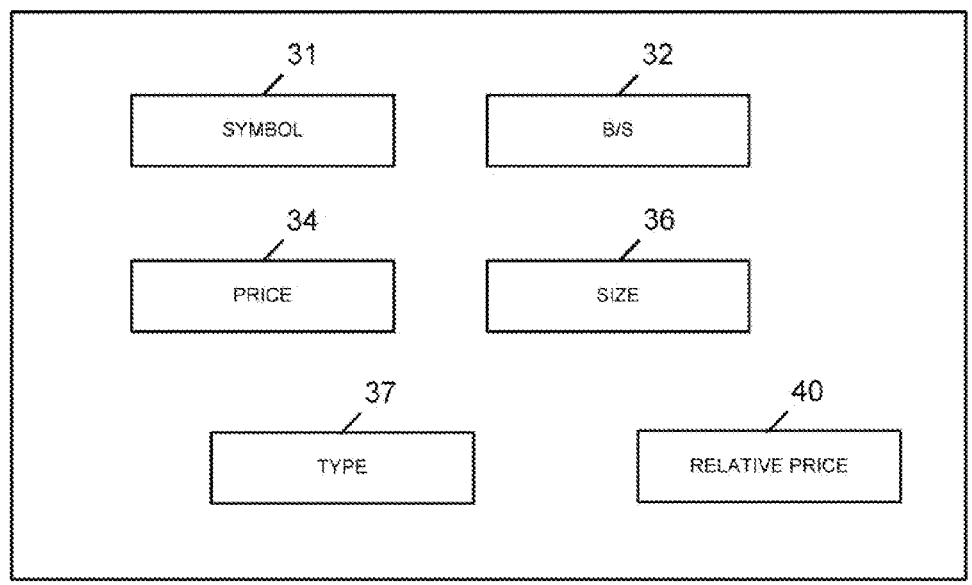

Referring to FIG. 2, a first exemplary format 30 for orders includes a field 31 for entering a name or symbol representing a security, a b/s field 32 that represents whether the order is a buy (b) or sell (s) order, a price field 34, and a size field 36 that represents the number of shares in the order. The format 30 also includes a type field 37. The type field 37 can have various values representing different types of orders. If the value of the type field 37 is "MOC", "LOC" or "IO", then the order is a closing order. The value of the price field 34 is interpreted as a limit price for LOC and IO orders. The value of the size field 36 indicates a number of shares to be traded upon execution of the order. Alternatively, instead of including an explicit type field 37, the value of the type field 37 can be implicitly derived from evaluation of other fields.

A second exemplary format 38 for orders includes an optional relative price field 40 for specifying a relative limit price for IO orders. An IO order that uses this relative price field 40 does not include a value in the price field 34, but instead specifies a limit price as a percentage deviation from a predetermined benchmark price. Orders may include other fields.

Imbalance Indicator

The information disseminated over the data feed 16 includes an "order imbalance indicator." The order imbalance indicator includes information about closing orders, as described in more detail below, and the price at which those closing orders would execute at the time the order imbalance indicator is disseminated. For example, the order imbalance indicator is disseminated at predetermined time intervals before the close of the market.

The information included in the order imbalance indicator at a given time, for a given security is based on an "order imbalance" in that exists in the market at that time. The trading module 24 identifies an order imbalance based on orders in a queue 22 for a security at a particular time by identifying a number of On-Close buy shares "MB" that are "marketable" at or above the inside offer (i.e., are MOC or LOC priced at or above the inside offer), and a number of On-Close sell shares "MS" that are "marketable" at or below the inside bid (i.e., are MOC or LOC priced at or below the inside bid). The trading module 24 identifies a number of shares of sell closing orders "PS" (On-close and IO orders) that can be paired (or "crossed") with the marketable On-Close buy shares, and a number of shares of buy closing orders "PB" (On-close and IO orders) that can be paired with the marketable On-Close sell shares. The order imbalance corresponds to the number of shares of On-Close orders that are not executed when the maximum number of shares of closing orders are paired at the inside "inside match price."

When MIN(MB,PS)>MIN(MS,PB) the inside match price is the inside offer and there is a "buy side" order imbalance of MB-PS shares. When MIN(MB,PS)<MIN(MS,PB) the inside match price is the inside bid and there is a "sell side" order imbalance of MS-PB shares. The order imbalance can also be calculated as MAX(MB-PS, MS-PB). When the order imbalance is zero (i.e., MB-PS≦0 and MS-PB≦0) the inside match price is the "inside bid-offer midpoint" (i.e., the average of the inside bid and the inside offer). If there are no On-Close orders, then the inside match price is zero.

The following information, described in (1)-(5) below, can be included in the order imbalance indicator at a given time, for a given security. The order imbalance indicator can be disseminated as a data stream and have a format that includes at least one of the information fields: PSH, MP, IMB, ISH, IPR, or PVI described below.

(1) Paired Shares (PSH) and Inside Match Price (MP)

The imbalance indicator includes the number of shares (PSH) corresponding to MOC, LOC and IO orders that are eligible to be paired at the current inside match price (MP), and the current inside match price (i.e., the match price at the given time).

(2) Imbalance (IMB) and Imbalance Shares (ISH)

The imbalance indicator includes the number of shares (ISH) corresponding to MOC and LOC orders that are not eligible to be paired at the current inside match price (i.e., the On-Close order imbalance), and a label (IMB) indicating "Buy" for a buy side imbalance, "Sell" for a sell side imbalance, "Zero Imbalance" for a zero order imbalance (i.e., all On-Close orders are paired), or "No Imbalance" when there are no On-Close orders. Alternatively, the label IMB can be indicated by numerical values. For example Buy or Sell can be indicated by positive or negative values, and a Zero Imbalance and/or No Imbalance can be indicated by a value of 0.

(3) Indicative Price Range (IPR)

The imbalance indicator includes an indicative price range for the closing price if the closing were to occur at the given time. The indicative closing price range is bounded on the far side (i.e., the top of the range) by the "far indicative closing price" at which the MOC, LOC, and IO orders would execute if paired with each other (with no unpaired On-Close orders). The indicative closing price range is bounded on the near side (i.e., the bottom of the range) by the "near indicative closing price" at which the MOC, LOC, IO and continuous orders (excluding volume that is available only by order delivery) would execute if paired with each other (with no unpaired On-Close orders). For either the near or far indicative closing price calculations, if the On-Close orders cannot be fully paired against offsetting orders, then no indicative closing price exists and the server system 20 disseminates a "no indicative price" indicator including the phrase "market buy" for a buy side imbalance or "market sell" for a sell side imbalance, and one or both of the near and far indicative closing prices are listed as zero. If there are no On-Close orders, the near and far indicative closing prices are listed as zero and the "no indicative price" indicator is blank.

(4) Price Variance Indicator (PVI)

The imbalance indicator includes a price variance indicator based on the percent by which the near indicative price varies from the inside bid, if the near indicative price is less than the inside bid, or from the inside offer, if the near indicative price is larger than the inside offer. If the near indicative price is between the inside bid and the inside offer (i.e., within the "inside spread"), then the price variance indicator is zero. The value of the price variance indicator is disseminated in coded form according to the codes listed in Table 1.

TABLE 1

| Code | Value |
|---|---|
| L | <1% |
| 1 | 1% |
| 2 | 2% |
| 3 | 3% |
| 4 | 4% |
| 5 | 5% |
| 6 | 6% |
| 7 | 7% |
| 8 | 8% |
| 9 | 9% |
| A | 10% to 19.99% |
| B | 20% to 29.99% |
| C | 30% or greater |
| <space> | Not Calculated |

(5) Timestamp (TS)

The imbalance indicator includes the time (HH:MM:SS) when the Imbalance was calculated. The time corresponds to one of a series of times for dissemination of the imbalance indicator. At 3:50:00, the trading module 24 begins transmitting the order imbalance indicator over the data feed 16 (e.g., a Nasdaq TotalView® data feed, or an Application Programming Interface (API) data feed). The imbalance indicator is disseminated beginning at 3:50:00 and thereafter at more frequent intervals as the time to market close decreases: every 30 seconds beginning at 3:50, every 15 seconds beginning at 3:55, every 5 seconds beginning at 3:58, and every second from 3:59 until market close.

Imbalance Indicator Example

For example, at 3:59:00 p.m. the queue 22 for a security has the following continuous orders:

TABLE 2

| Buy Orders | |
|---|---|
| Size | Price |
| 4000 | 19.99 |
| 3000 | 19.98 |
| 2000 | 19.97 |
| 10000 | 19.96 |

TABLE 3

| Sell Orders | |
|---|---|
| Size | Price |
| 500 | 20.00 |
| 35000 | 20.01 |
| 3000 | 20.02 |
| 10000 | 20.04 |

The inside bid is indicated as $19.99 and the inside offer is indicated as $20.00. The size of each order in number of shares is included in the queue 22 and listed in Table 2 and Table 3 above and Table 4 and Table 5 below. At 3:59:00 p.m., the queue 22 has the following closing orders:

TABLE 4

Buy Orders

| Size | Price | Type |
|------|-------|------|
| 8000 | Market | MOC |
| 3000 | 20.02 | LOC |
| 1000 | 19.99 | LOC |
| 4000 | 19.97 | LOC |
| 500 | 19.97 | IO |

TABLE 5

Sell Orders

| Size | Price | Type |
|------|-------|------|
| 5000 | Market | MOC |
| 3000 | 19.98 | LOC |
| 1000 | 19.98 | IO |
| 1000 | 20.00 | IO |
| 1000 | 20.02 | LOC |

Based on these orders listed in Tables 2-5, the server system 20 would disseminate the following information in the order imbalance indicator: (1) 10,000 shares (PSH) paired at a $20.00 inside match price(MP); (2) 1,000 share (ISH) "Buy" imbalance (IMB); (3) indicative price range of $20.01-$20.02 (IPR); (4) variance indicator of "L" (PVI); (5) (TS) timestamp of "03:59:00."

Before determining the Paired Shares (PSH), the server system 20 temporarily re-prices (i.e., the queue 22 for the security stores the original price and a new price is stored in a temporary storage location in the storage module 21) IO buy or sell orders that are priced more aggressively than the inside bid or offer, respectively (as described above). In this example, the IO sell order of 1000 shares at $19.98, priced more aggressively than the inside offer of $20.00, is temporarily re-priced to $20.00. The IO orders are potentially re-priced again at the next dissemination of the order imbalance indicator based on the inside bid and offer at the time.

The number of shares of On-Close buy orders MB that are marketable at or above the inside bid are 8,000 (at Market) and 3,000 (at $20.02) totaling 11,000 shares. The number of shares of sell closing orders PS that can be paired with those shares are 5,000 (at Market), 3,000 (at $19.98), and 2,000 (at $20.00; 1,000 of which correspond to the re-priced IO orders) totaling 10,000 shares. So the server system 20 is able to pair 10,000 shares (PSH) at the $20.00 inside offer, leaving a "Buy" (IMB) imbalance of 1,000 shares (ISH).

The server system 20 determines the far indicative closing price as the price at which the greatest number of shares of MOC, LOC, and IO orders can be paired with each other. In this example, 11,000 shares can be executed at a price of $20.02. So the far indicative closing price is $20.02

The server system 20 determines the near indicative closing price as the price at which the greatest number of MOC, LOC, IO and continuous orders can be paired with each other. In this example, for the near indicative closing price, 11,000 shares can be executed at a price of $20.01 or $20.02. The server system 20 selects the price that leaves the smallest number of unpaired shares, which in this case is $20.01, leaving 4,500 unpaired shares on the sell side. (A price of $20.02 would leave 8,500 unpaired shares on the sell side.) So the near indicative closing price is $20.01.

Closing Process

At or shortly after market close (e.g., at 4:00:00 p.m.) the trading module 24 performs a closing process 26. The closing process 26 determines 40 a closing price for each security based on the closing orders and continuous orders in the storage module 21 at the close. After determining the final closing price, the closing process 26 executes 42 some or all of those orders at the determined final closing price. After the closing process 26 concludes (e.g., at approximately 4:00:05 p.m.) the server system 20 reports the closing orders executed (e.g., in a report to the consolidated tape for Nasdaq securities including the aggregate of shares executed at the closing price) and after hours trading may commence. The closing process 26 attempts to accomplish three goals, for each security, in decreasing priority: (1) maximize the number of shares executed at the closing price; (2) minimize On-Close order imbalance; and (3) minimize the distance of the closing price from the 4:00:00 inside bid-offer midpoint.

Figure 3:
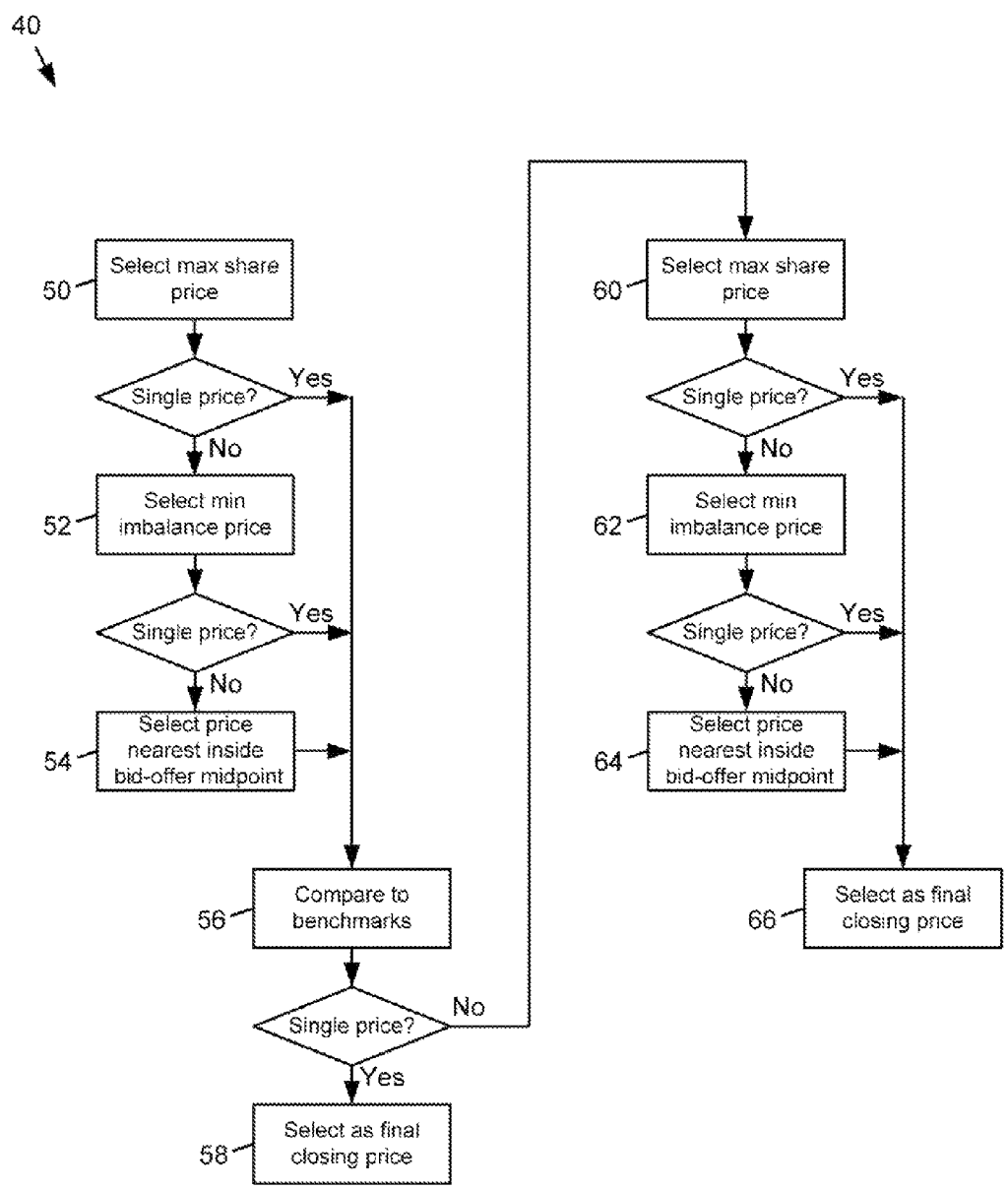
FIG. 3 is a flow chart showing a process for determining a closing price.

Referring to FIG. 3, the closing process 26 determines 40 a final closing price for each security. The closing process 26 selects 50 a preliminary closing price that maximizes that number of shares executed. If more than one such price exists, the closing process 26 selects 52 a price that minimizes the On-Close order imbalance. If more than one such price exists, the closing process 26 selects 54 a price that is closest to the inside bid-offer midpoint at closing.

After selecting a preliminary closing price, the closing process 26 performs a benchmark threshold test to protect against unusual occurrences (e.g., the closing price discovery mechanism described herein did not function as expected). The closing process 26 compares 56 the preliminary closing price of each security to one or more benchmark values representing market conditions approximately five seconds prior to the close. For example, one benchmark value that can be used is the volume weighted average of the orders executed by the trading module 24 over the period from 3:59:55 to 4:00:00 (Volume Weighted Average Price (VWAP)). Optionally, the volume weighted average of the inside bid-offer midpoint over the period from 3:59:54 to 3:59:57 (Volume Weighted Average Inside (VWAI)) can be used as a second benchmark value.

If the preliminary closing price for a security is within a predetermined percentage (the "Threshold Percentage") of the benchmark value (or of any of multiple benchmark values), the closing process 24 selects 58 the preliminary closing price as the final closing price for that security. The Threshold Percentage is selected, for example, based on market conditions and past results of the closing process 24. The server system 20 publicly publishes the Threshold Percentage (e.g., via the NasdaqTrader® website). Otherwise, if the preliminary closing price for a security is not within the Threshold Percentage of either the VWAI or the VWAP, the closing process 24 selects a final closing price for that security that is constrained to be within the Threshold Percentage of either benchmark according to the same three goals: (1) maximize the number of shares executed at the closing price; (2) minimize On-Close order imbalance; and (3) minimize the distance of the closing price from the 4:00:00 inside bid-offer midpoint. The closing process 24 selects 60 a closing price within the Threshold Percentage of either benchmark that maximizes that number of shares executed. If more than one such price exists, the closing process 26 selects 62 a price that minimizes the On-Close order imbalance. If more than one such price exists, the closing process 26 selects 64 a price that is closest to the inside bid-offer midpoint at closing. The closing process 26 executes 42 some or all of the orders for each security at the determined final closing price for that security.

Order Execution Priority

If, for a security, the closing process 26 executes fewer than all of the closing orders and all of the continuous orders that are available for automatic execution, then the closing process 26 executes orders in the following priority:

(1) MOC orders, with time as the secondary priority (older orders before newer orders);

(2) LOC orders, limit orders, IO orders, displayed quotes and reserve interest that are priced more aggressively than the final closing price, with time as the secondary priority;

(3) LOC orders, IO orders, displayed interest of limit orders, and displayed interest of quotes at the final closing price, with time as the secondary priority;

(4) Reserve interest at the Nasdaq Closing Cross price, with time as the secondary priority.

The remaining unexecuted closing orders for that security are canceled.

Closing Process Example

For example, the continuous and closing orders for a security include following orders at closing (i.e., 4:00:00 p.m.):

TABLE 6

Buy Orders

| Entry Time | Side-type | Size | Price |
|---|---|---|---|
| 3:00 | Buy-OC | 8000 | Market |
| 2:30 | Buy-OC | 3000 | 20.02 |
| 3:31 | Buy-cont | 4000 | 19.99 |
| 3:35 | Buy-OC | 1000 | 19.99 |
| 3:59 | Buy-cont | 3000 | 19.98 |
| 3:59 | Buy-cont | 2000 | 19.97 |
| 3:40 | Buy-OC | 4000 | 19.97 |
| 3:52 | Buy-IO | 500 | 19.97 |
| 3:30 | Buy-cont | 10000 | 19.96 |

TABLE 7

Sell Orders

| Entry Time | Side-type | Size | Price |
|---|---|---|---|
| 2:45 | Sell-OC | 5000 | Market |
| 3:00 | Sell-OC | 3000 | 19.98 |
| 3:55 | Sell-IO | 1000 | 19.98 |
| 3:59 | Sell-cont | 500 | 20.00 |
| 3:35 | Sell-IO | 1000 | 20.00 |
| 3:48 | Sell-cont | 5000 | 20.01 |
| 3:31 | Sell-cont | 3000 | 20.02 |
| 3:40 | Sell-OC | 1000 | 20.02 |
| 3:30 | Sell-cont | 10000 | 20.04 |

The closing process re-prices the 3:55 IO sell order priced at the $19.98 to the inside offer price of $20.00 (based on the 3:59 continuous order priced at $20.00). The closing process 26 determines a final closing price of $20.01. Although 11,000 shares can be executed at both $20.01 and $20.02, and the On-Close order imbalance is 0 shares at both $20.01 and $20.02, the $20.01 price is closer to the 4:00:00 inside offer of $20.00. The closing process 26 executes 11,000 shares at the final closing price of $20.01 as follows:

TABLE 8

Buy Orders

| Entry Time | Side-type | Size | Shares Executed |
|---|---|---|---|
| 3:00 | Buy-OC | 8000 | ALL |
| 2:30 | Buy-OC | 3000 | ALL |
| 3:31 | Buy-cont | 4000 | 0 |
| 3:35 | Buy-OC | 1000 | 0 |
| 3:59 | Buy-cont | 3000 | 0 |
| 3:59 | Buy-cont | 2000 | 0 |
| 3:40 | Buy-OC | 4000 | 0 |
| 3:52 | Buy-IO | 500 | 0 |
| 3:30 | Buy-cont | 10000 | 0 |

TABLE 9

Sell Orders

| Entry Time | Side-type | Size | Shares Executed |
|---|---|---|---|
| 2:45 | Sell-OC | 5000 | ALL |
| 3:00 | Sell-OC | 3000 | ALL |
| 3:55 | Sell-IO | 1000 | ALL |
| 3:59 | Sell-cont | 500 | ALL |
| 3:35 | Sell-IO | 1000 | ALL |
| 3:48 | Sell-cont | 5000 | 500 |
| 3:31 | Sell-cont | 3000 | 0 |
| 3:40 | Sell-OC | 1000 | 0 |
| 3:30 | Sell-cont | 10000 | 0 |

All shares of the eligible On-Close orders are executed. The 3:48 continuous sell order priced at $20.01 has 500 of its 5000 offered shares executed.

The executed orders may be reported using an anonymous trading mechanism (e.g., reporting executed anonymous orders to the consolidated tape with SIZE as the contra party). The determined final closing price and the associated paired volume are disseminated via the data feed 16 as the "official closing price."

The closing process 26 (shown in FIG. 3) described herein is not limited to the embodiment described above; it may find applicability in any computing or processing environment. The closing process may be implemented in hardware, software, or a combination of the two. For example, the closing process may be implemented using circuitry, such as one or more of programmable logic (e.g., an ASIC), logic gates, a processor, and a memory.

The closing process may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the closing process. The closing process may also be implemented as a machine-readable storage medium, configured with a computer program, where, upon execution, instructions in the computer program cause a machine to operate to perform the functions of the closing process described above.

Embodiments of the closing process may be used in a variety of applications. Although the closing process is not limited in this respect, the closing process may be implemented with memory devices in microcontrollers, general purpose microprocessors, digital signal processors (DSPs), reduced instruction-set computing (RISC), and complex instruction-set computing (CISC), among other electronic components.

Embodiments of the closing process may also be implemented using integrated circuit blocks referred to as core memory, cache memory, or other types of memory that store electronic instructions to be executed by a microprocessor or store data that may be used in arithmetic operations.

Embodiments can be applied to a variety trading systems including a venue for trading securities electronically, such as an electronic commerce network, an electronic auction, an exchange, or an electronic exchange. The electronic market can use an opening process including any or all of the features described herein for the closing process (e.g., for determining an opening price before the opening of trading).

A number of embodiments of the invention have been described. Nevertheless, it will be understood that various modifications may be made without departing from the spirit and scope of the invention.

What is claimed is:

1. A computer implemented method for trading a security in an electronic market, comprising:
   receiving by one or more computers closing orders and other orders for the security traded in the electronic market;
   determining by one or more computers an order imbalance indicator indicative of predicted trading characteristics of the security at the close of trading;
   disseminating by the one or more computers the order imbalance indicator, the predicted trading characteristics being based on upon a price at which those closing orders would execute at a particular time before the close of trading;
   determining by the one or more computers a closing price for the security based on the closing orders and other orders; and
   executing by the one or more computers at least some of the closing orders at the determined closing price.

2. The method of claim 1, wherein the closing orders comprise imbalance only orders.

3. The method of claim 2, further comprising:
   modifying a limit price associated with one of the imbalance only orders based on a comparison between the limit price and an inside price.

4. The method of claim 1, wherein the closing orders comprise limit-on-close orders.

5. The method of claim 1 wherein the closing orders comprise market-on-close orders.

6. The method of claim 1, further comprising periodically producing the order imbalance indicator over a series of time periods.

7. The method of claim 1 wherein the order imbalance indicator comprises at least one of:
   an inside match price;
   a number of shares paired at an inside match price;
   an on-close order imbalance;
   a buy/sell direction of the on-close order imbalance;
   an indicative clearing price range associated with the first of the series of times; or
   a percentage by which an indicative price varies from an inside price.

8. The method of claim 1, wherein determining the closing price comprises:
   determining a preliminary closing price;
   comparing the preliminary closing price to a benchmark value representing market conditions prior to the close of trading; and
   determining the closing price based on the comparison.

9. A server computer system for an electronic market for trading of securities including a client station for entering a closing order for a security traded in the electronic market, the server computer system comprising:
   storage media for providing a queue storing the closing order along with other orders;
   with the server computer system configured to:
   determine an order imbalance indicator indicative of predicted trading characteristics of the security at the close of trading;
   disseminate the order imbalance indicator, the predicted trading characteristics being based on upon a price at which those closing orders would execute at a particular time before the close of trading;
   determine a closing price for the security based on the stored orders; and
   execute at least some of the orders at the determined closing price.

10. The server computer system of claim 9, wherein the closing orders comprise imbalance only orders.

11. The server computer system of claim 10, wherein the server computer system is configured to:
    modify a limit price associated with one of the imbalance only orders based on a comparison between the limit price and an inside price.

12. A computer program product tangibly embodied on a computer-readable storage device for use in an electronic market for trading of securities comprises instructions for causing a processor to:
    receive closing orders and other orders for the security traded in the electronic market;
    determine an order imbalance indicator indicative of predicted trading characteristics of the security at the close of trading;
    disseminate the order imbalance indicator, the predicted trading characteristics being based on upon a price at which those closing orders would execute at a particular time before the close of trading;
    determine a closing price for the security based on the closing orders and other orders; and
    execute at least some of the closing orders at the determined closing price.

13. The computer program product of claim 12, wherein the closing orders comprise imbalance only orders.

14. The computer program product of claim 13, further comprising instructions for causing the processor to:
    modify a limit price associated with one of the imbalance only orders based on a comparison between the limit price and an inside price.

15. A computer implemented method for trading a security in an electronic market, comprising:
    receiving closing orders and other orders for the security traded in the electronic market;
    determining by one or more computers a closing price for the security based on the closing orders and other orders, the closing price being within a predetermined range of a benchmark value representing market conditions prior to the close of trading; and executing at least some of the closing orders at the determined closing price.

16. The method of claim 15, wherein the benchmark value comprises a volume weighted average of orders executed during a predetermined time period before the close of trading.

17. A system comprising:
a server system, the server system comprising
a processor; and
a memory for storing instructions which when executed cause the processor to:
publish over a computer network prior to a close of trading in an electronic trading venue, an information data stream to computer systems, the information data stream comprising at least one of:
an inside match price based on an imbalance of closing orders received by the electronic trading venue; or
a near indicative clearing price for a closing price if the market were to close at a time when the near indicative clearing price is determined,
wherein the inside match price is selected from an inside bid price, an inside offer price, an inside bid-offer midpoint price, or zero, based on an imbalance of closing orders,
wherein the near indicative clearing price further comprises a determined price at which closing orders and other orders would execute if paired with each other.

18. The system of claim 17, further comprising instructions to:
publish the information data stream comprising at least one of a number of shares paired at the inside match price, an on-close order imbalance, a buy/sell direction of the on-close order imbalance, or a percentage by which the indicative price varies from the inside price.

19. The system of claim 17, wherein server system resides in the electronic trading venue, with the venue being one of an electronic commerce network, an auction, an exchange, or an electronic exchange or an electronic market.

* * * * *